UNITED STATES PATENT OFFICE.

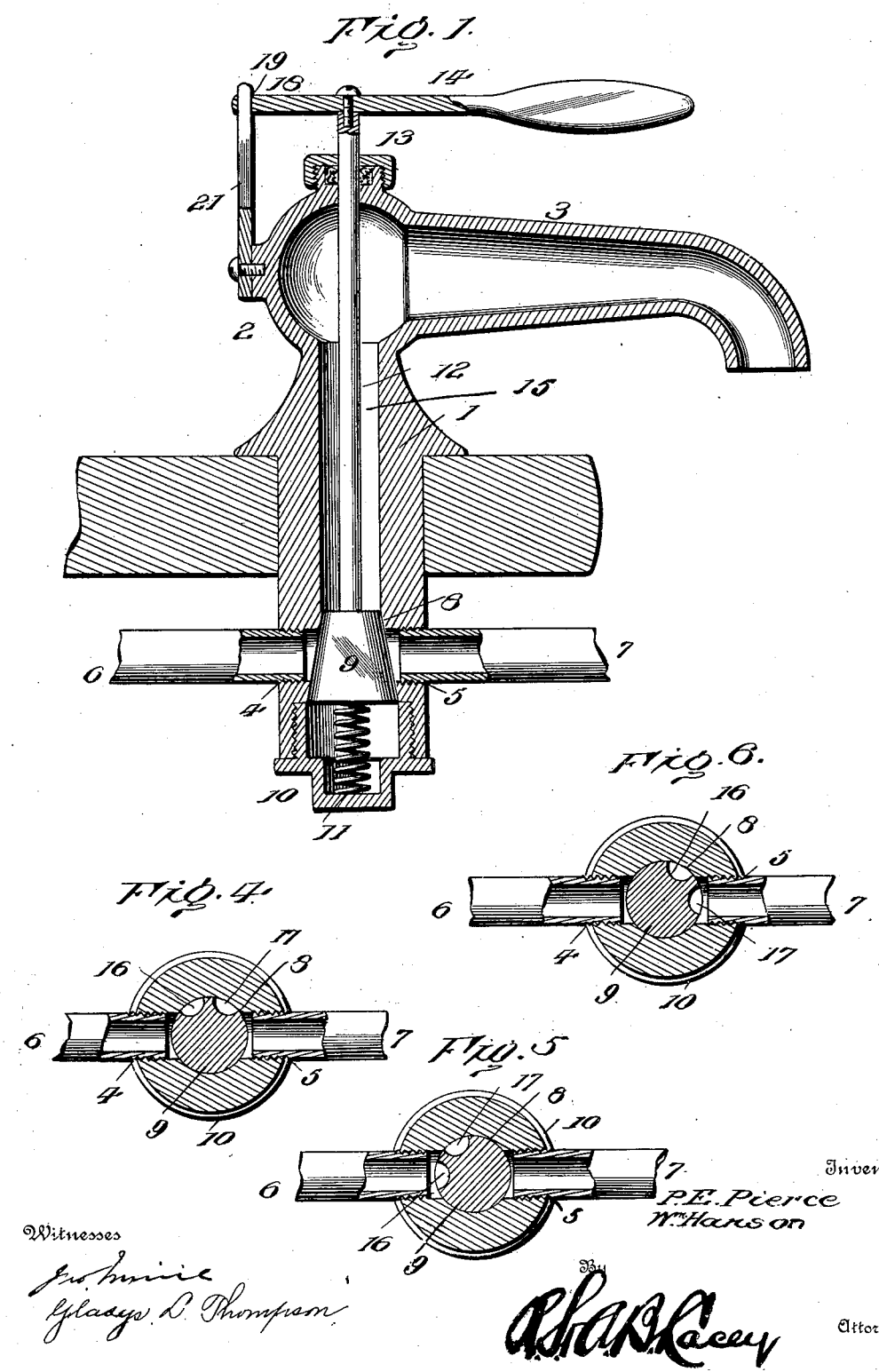

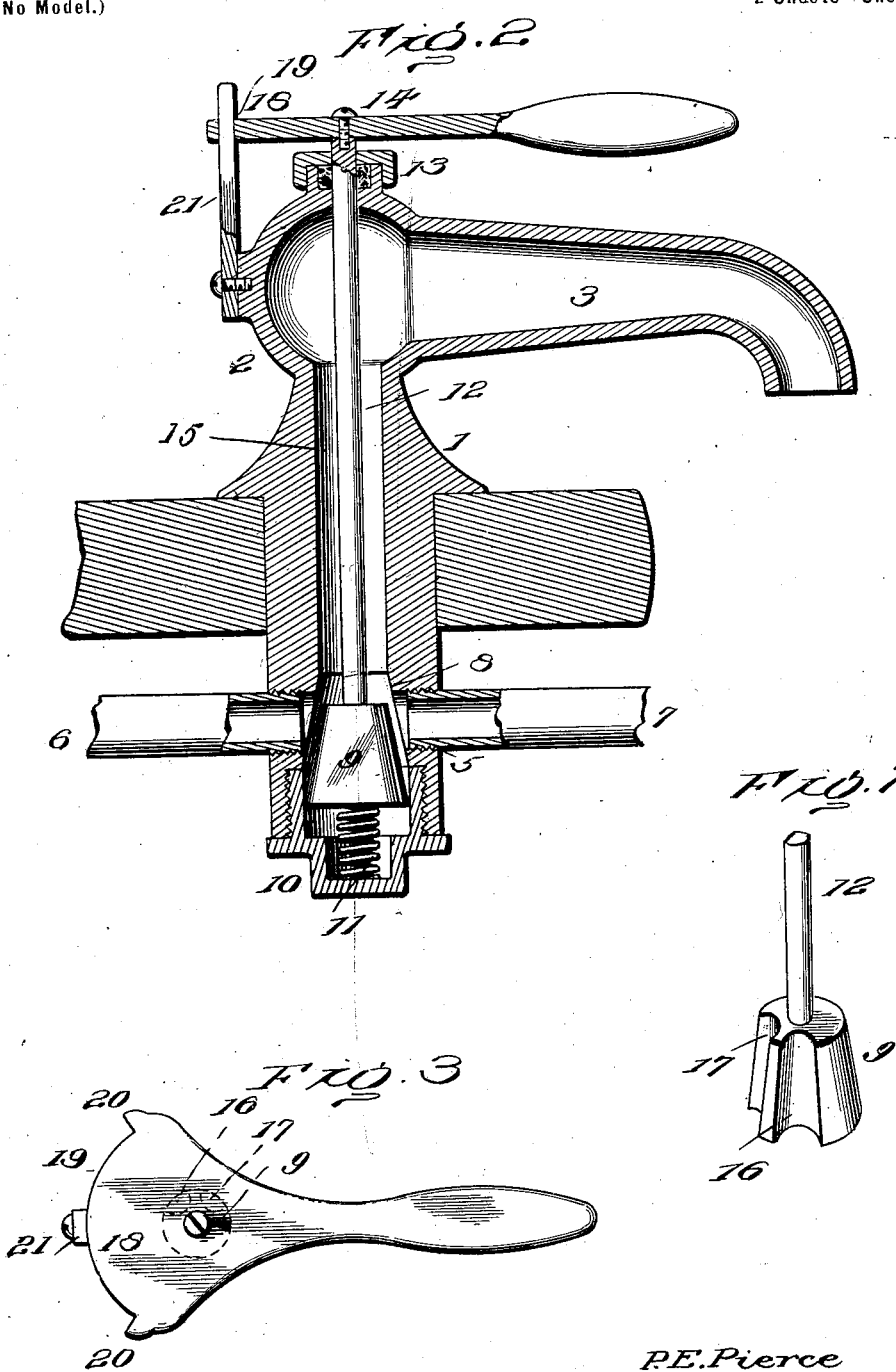

PERCY E. PIERCE AND WILLIAM HANSON, OF CLEVELAND, OHIO.

HOT OR COLD WATER FAUCET.

SPECIFICATION forming part of Letters Patent No. 713,144, dated November 11, 1902.

Application filed January 9, 1902. Serial No. 89,077. (No model.)

*To all whom it may concern:*

Be it known that we, PERCY E. PIERCE and WILLIAM HANSON, citizens of the United States, residing at Cleveland, in the county of Cuyahoga and State of Ohio, have invented certain new and useful Improvements in Hot or Cold Water Faucets; and we do hereby declare the following to be a full, clear, and exact description of the invention, such as will enable others skilled in the art to which it appertains to make and use the same.

This invention provides a single faucet of novel construction for drawing either hot, cold, or lukewarm water, as desired, the valve being two-way and mounted for rotation and reciprocation, the rotary movement admitting either hot or cold water and the reciprocating movement permitting a combined outflow of hot and cold water which is mixed before escaping.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a vertical central section of a faucet embodying the invention. Fig. 2 is a view similar to Fig. 1, showing the valve depressed for drawing off lukewarm water. Fig. 3 is a top view. Fig. 4 is a section showing the relation of the valve when the water is turned off. Fig. 5 is a view similar to Fig. 4, showing the valve turned to draw off hot water. Fig. 6 is a view like Fig. 4, showing the valve turned to draw off cold water. Fig. 7 is a perspective view of the valve.

Corresponding and like parts are referred to in the following description and indicated in all the views of the drawings by the same reference characters.

The faucet shown is of the type generally constructed for use in connection with washbasins and analogous fixtures; but it is to be understood that the invention is susceptible of a wide range of application in connection with the various forms of cocks for drawing off different kinds of liquid. As shown, the body of the faucet comprises a tubular stem 1, a bulbous head 2, and a nozzle 3. Inlets 4 and 5 are provided in the lower portion of the stem 1 for connection therewith of the hot and cold water pipes 6 and 7. A tapering valve-seat 8 is formed in the lower end of the stem in the plane of the inlets 4 and 5, and a tapering plug-valve 9 coöperates therewith for controlling the outflow of the water or other liquid to be drawn off by means of the faucet. A cap 10 closes the lower end of the stem and receives a coil-spring 11, which exerts an upward pressure on the valve 9 to hold it seated. The valve-stem 12 passes through the vertical portion of the faucet and through a stuffing-box 13 at the upper end of the bulbous head 2 and is provided with an operating-handle 14, secured thereto in any desired way. The valve 9 is of the plug type and tapers upwardly and is held seated by means of the coil-spring 11 and normally closes the inlets 4 and 5. The stem 12, provided for operating the valve, is of a size to leave a space 15 between it and the inner walls of the portion of the valve-casing through which it passes for the outflow of water when the valve is opened. Channels 16 and 17 are formed vertically in a side of the valve 9 and are adapted to register with either inlet 4 or 5, according as hot or cold water is to be drawn off. The manner of form and construction of these passages is immaterial within the purview of the invention, so long as the desired purpose is attained.

The operating-handle 14 has its rear end flattened and widened, as shown at 18, and the rear portion is formed on the arc of a circle, as shown at 19, stops 20 being provided at the ends of the curved portion 19 to limit the movement of the handle in each direction. A bar 21 is secured at its lower end to the body of the faucet and its upper end extends into the path of the stops 20 to be struck thereby for limiting the turning of the handle when opening the valve in either direction. Upon turning the handle 14 to the right, so as to bring the passage 16 of the valve in register with the inlet 4, hot water may be obtained and upon turning the handle to the left to bring the passage 17 in register with the inlet 5 cold water may be drawn off, and upon depressing the handle 14 the valve 9 is unseated and both hot and cold water pass into the body of the faucet and become mixed and are drawn off as lukewarm water. When the handle 14 stands parallel with the nozzle 3 and with the bar 21 midway between the stops 20, the valve is closed. The valve has a twofold movement—namely, a rotary movement to admit of either hot or cold water being drawn off and a reciprocating movement for drawing off lukewarm water.

Having thus described the invention, what is claimed as new is—

1. A faucet having a single outlet and a plurality of inlets, and a valve mounted for rotary and reciprocating movement and having independent passages to be brought into register with a selected inlet upon rotation of the valve and adapted to uncover all of the inlets upon moving the valve longitudinally, substantially as specified.

2. A valve casing or body having a single outlet and a plurality of inlets, and a tapering plug-valve mounted within the valve-body for rotary and reciprocating movement and having independent passages to be brought into register with a selected inlet upon rotation of the valve, all the inlets being adapted to be uncovered upon moving the valve longitudinally, substantially as set forth.

3. In a faucet having a single outlet, a plurality of inlets, a tapering plug-valve mounted within the valve-body, said valve having a rotary and reciprocatory movement, vertical channels formed in the side of the valve and adapted to be brought into register with the aforementioned inlets upon rotation of the valve-stem, all the inlets adapted to be uncovered upon longitudinal movement of the valve, substantially as set forth.

In testimony whereof we affix our signatures in presence of two witnesses.

PERCY E. PIERCE. [L. S.]
    WILLIAM HANSON. [L. S.]

Witnesses:
    PAUL A. ZIZELMAN,
    JOHN B. MCCART.